United States Patent [19]

Bartram et al.

[11] Patent Number: 5,069,797
[45] Date of Patent: Dec. 3, 1991

[54] VX ADSORPTION FROM A CHLOROFLUOROCARBON SOLVENT USING A MACRORETICULAR STRONG ACID RESIN

[75] Inventors: Philip W. Bartram, Abingdon; Noel C. DiBona, Apg, both of Md.; James H. Buchanan, Newark, Del.; Dennis K. Rohrbaugh, Bel Air, Md.

[73] Assignee: The United States of America as represented by the Secretary of the Army, Washington, D.C.

[21] Appl. No.: 637,028

[22] Filed: Jan. 3, 1991

[51] Int. Cl.$^5$ .............................................. G01D 15/04
[52] U.S. Cl. .................................. 210/690; 210/908; 210/911
[58] Field of Search ....................... 210/690, 908, 911

[56] References Cited

U.S. PATENT DOCUMENTS

| | | | |
|---|---|---|---|
| 4,046,939 | 9/1977 | Hart | 55/74 |
| 4,842,746 | 6/1989 | Fowler et al. | 210/690 |
| 4,874,532 | 10/1989 | Worley | 210/755 |
| 4,933,669 | 6/1990 | Lyons | 340/632 |
| 5,009,845 | 4/1991 | Thoraval et al. | 422/56 |

Primary Examiner—Stanley S. Silverman
Assistant Examiner—Cynthia L. Nessler
Attorney, Agent, or Firm—Anthony T. Lane; Edward Goldberg; Edward F. Costigan

[57] ABSTRACT

A polydivinylbenezene macroreticular strong acid resin can effectively decontaminate solutions containing organophosphorus chemical warfare agents such as o-ethyl S-(2-diisopropylaminoethyl) methylphosphonothiolate (VX).

3 Claims, No Drawings

VX ADSORPTION FROM A CHLOROFLUOROCARBON SOLVENT USING A MACRORETICULAR STRONG ACID RESIN

GOVERNMENTAL INTEREST

The invention described herein may be made, used or licensed by or for the Government for governmental purposes without the payment to use of any royalties thereon.

FIELD OF USE

The Nonaqueous Equipment Decontamination System (NAEDS) was developed to provide the U.S. Army the capability to remove chemical agent contamination from electronics, avionics, and other items sensitive to conventional decontaminating solutions.

BACKGROUND OF INVENTION

The present NAEDS design includes a chlorofluorocarbon (CFC) spray which removes the contaminant from the item. The CFC solvent/agent solution is processed by mixing with sodium hypochlorite in an in-line mixer. The CFC solvent is then separated from the aqueous hypochlorite by decanting, and finally distilled. The NAEDS was developed for use in nuclear, biological, and chemical hardened facilities. Therefore, the size and weight of the system were not critical. Because the process equipment is too large, heavy, and energy intensive, it cannot easily be adapted to a mobile concept.

PRESENT INVENTION

This invention, by demonstrating that the purification system could be replaced by a small adsorption column, indicated that the usefulness of the NAEDS technology could be significantly extended.

Two major criteria were considered in evaluating the NAEDS purification system for replacement by an adsorption column. First, the rate of sorption of threat chemical warfare agents from the contaminated CFC solvent must be significantly greater than the rate of sorption of the CFC solvent. Second, the rate of agent desorption from the column material should be significantly less than the rate of sorption. This series of static tests was designed to address both of these partitioning characteristics.

Comparative evaluation of various particle structures can be based on factors such as capacity and rate of sorption. Recent advances by researchers in related fields have led to formulations that combine sorptive and reactive properties into a single material. Catalytic substituents are available on, or can be incorporated into, a wide spectrum (gel, hollow gel spheres, macroreticular, carbonized gel, foam, and macronet) of particle structures. Each provides one or more sets of intermolecular forces (absorption, adsorption, capillary forces, steric-strain relief, etc.) for retaining contaminants. Once retained, the chemical warfare agents (CWA) can be detoxified by the reactive substituents of the particles.

It has been found that a macroreticular strong acid resin, such as Amberlite XE-393, which chemical is divinylbenzene polymer, would effectively sorb and decontaminate organophosphorus CWA. Basic research focused on the development of decontaminating coatings, recommended sulfonic acid catalysts on a hydrophobic polymer particle. It should be noted that adsorptive, macroreticular particles functioned well in retaining contaminants.

In the past, in the evaluation of candidate materials to remove undesired contaminants from flowing air streams, it has been reported that strong acids, high surface area, ion exchange resins have very good dynamic adsorption capacity for the G-agent simulant, diisopropyl fluorophosphate, under dry and humid (80% RH) conditions. In addition, acid catalyzed hydrolysis was observed under humid conditions.

This invention is the first in a series of discoveries describing the results of research studies aimed at purification of agent contaminated CFC using state-of-the-art sorption technologies. It focuses on the initial research studies designed to determine the feasibility of removing O-ethyl S-(2-diisopropylaminoethyl) methylphosphonothiolate (VX) from the NAEDS chlorofluorocarbon solvent, 1,1,2-trichloro-1,2,2-trifluoroethane, using the macroreticular strong acid resin, Amberlite XE-393. Future work will evaluate the efficiency of this resin in removing other known threat CWA from CFC. These results will be used to design a small scale adsorption column directed toward eventual replacement of the present NAEDS purification system.

PREFERRED EMBODIMENT

Materials

The VX sample (Lot No. VX-U-4308-CTF-N) used in these experiments was obtained from the Chemical Agent Standard Analytical Reference Material (CAS-ARM) Program at the U.S. Army Chemical Research, Development, and Engineering Center (CRDEC). Originally synthesized in November 1984 and determined to be 95.9% (w/w) pure by multinuclear Nuclear Magnetic Resonance (NMR) Spectroscopy, this particular sample was recently monitored ($^{31}$P NMR, March 1990) with no degradation detected. The composition of the VX sample is shown in Table 1.

TABLE 1

| Characterization of VX by NMR | |
|---|---|
| Area % - weight % | Species |
| 95.9 | VX |
| 1.5 | QL |
| 1.1 | P(S) sulfides |
| 1.0 | P(O) oxides |
| 0.4 | pyro (−22) |

No additional impurities were detected; no stabilizer detected.

Impurities, identified by Gas Chromatography/Mass Spectrometry (GC/MS) and matched by order of elution to Gas Chromatography (GC) results, see Table 2. Both GC and GC/MS data were obtained from a 1% solution of VX in CFC. The GC determined purity of the neat VX sample was 96.7% by area using a Flame Ionization Detector (FID).

TABLE 2
CHARACTERIZATION OF VX BY GAS CHROMATOGRAPHY/MASS SPECTROMETRY (GC/MS) AND GC

| Peak Number | GC/MS Compound Identification | | GC/MS-CI Results RT (min) | GC/MS-CI Results Area % | GC Results RT (min) | GC Results Area % |
|---|---|---|---|---|---|---|
| 1 | $Me-P(=O)(F)(OEt)$ | | 2.3 | 1.7 | 2.9 | 0.3 |
| 2 | $Me-P(=O)(H)(OEt)$ | (YL) | 3.5 | 1.1 | 3.7 | 0.1 |
| 3 | $Me-P(=O)(OEt)(OEt)$ | (TRO) | 5.0 | 0.3 | 4.5 | t |
| 4 | $Me-P(=S)(OEt)(OEt)$ | (TRS) | 5.3 | 1.9 | 4.8 | 0.5 |
| 5 | $ClCH_2CH_2N(i\text{-}C_3H_7)_2$ | | 5.4 | 0.8 | 4.9 | 0.2 |
| 6 | $ClCH_2CH_2-O-CH_2CH_2N(i\text{-}C_3H_7)_2$ | | 6.5 | 0.3 | 5.4 | 0.5 |
| 7 | $EtSCH=CHN(i\text{-}C_3H_7)_2$ | | 7.4 | 0.2 | 5.9 | 0.1 |
| 8 | $Me-P(=O)(Cl)-SCH_2CH_2N(i\text{-}C_3H_7)_2$ | | 7.8 | 0.1 | 6.2 | 0.0 |
| 9 | $Me-P(=O)(OEt)-O-P(=O)(OEt)-Me$ | (PYRO) | 9.9 | 0.4 | 7.3 | 0.1 |
| 10 | $Me-P(=S)(OEt)-O-P(=O)(OEt)-Me$ | (UNSYM PYRO) | 10.8 | 0.1 | 7.9 | 0.2 |
| 11 | $Me-P(=O)(OEt)-OCH_2CH_2N(i\text{-}C_3H_7)_2$ | (QB) | 12.2 | 1.5 | 8.6 | 1.0 |
| 12 | $Me-P(=S)(OEt)-OCH_2CH_2N(i\text{-}C_3H_7)_2$ | (CV) | 12.9 | 0.3 | 8.8 | 0.1 |
| 13 | $Me-P(=O)(OEt)-SCH_2CH_2N(i\text{-}C_3H_7)_2$ | (VX) | 14.2 | 90.4 | 9.6 | 96.2 |
| 14 | $(i\text{-}C_3H_7)_2NCH_2CH_2-S-CH_2CH_2N(i\text{-}C_3H_7)_2$ | | 15.6 | 1.0 | 10.5 | 0.7 |

The solvent, 1,1,2-trichloro-1,2,2-trifluoroethane, was obtained from E. I. Dupont de Nemours. No lot number was available. GC analysis using an FID resulted in an area % purity of 99.9. The only impurity eluted 12 seconds after the main peak using a 30 meter methylsilicone capillary column at 35° C. Amberite XE-393 (Lot 84/0079). The polydivinylbenzene ion exchange resin was supplied by Rohm and Haas Company, Philadelphia, Pa. The black spherical resin beads, with a surface area of 410 m²/g, a proprietary average pore size, and a 20/50 mesh range, were used as received. Detailed characteristics were previously determined. Amberlite is a registered trademark of Rohm and Haas Company.

Equipment

An HP 5880A GC equipped with an FID was used in this study. The analysis of VX was accomplished using a 30 meter fused silica capillary column (0.32 mm ID) with a 0.25 m film of methylsilicone (Alltech Econocap Series SE-30). The carrier gas was helium split at a 50:1 ratio. Pressure controlled (47 KPa) column flow resulted in a calculated helium flow of 22.7 cm/sec (1.1 mL/min) based on the retention gap (2.2 minutes) obtained for methane at 40° C. Detector make-up flow was helium at a rate of 23 mL/min. The injection port temperature was 225° C. and the detector temperature was 300° C. The column over temperature was programmed from 75° to 275° C. at 20 C./min and held at 275° C. for 10 minutes. The combustion gases were hydrogen and air, at 32 and 420 mL/min, respectively. The septum purge flow as adjusted to 1 mL/min. A Hamilton 7001SN microliter syringe was used to manually inject 1.0 μL sample volumes. Area integration of the resulting chromatographic peaks was accomplished electronically.

Experimental Procedure

Sample Preparation

To determine the adsorption efficiency of Amberlite XE-393 resin, a master dilution of VX in CFC was prepared. To 100 μL (101.01 mg) of VX, 10 mL of CFC was added volumetrically. This solution was transferred to a 10 mL glass reaction vial containing a small, teflon-coated magnetic stirbar, and sealed with a teflon-lined silicone septum and an aluminum crimp cap. This 1% (v/v) VX solution served as both the experimental sample for resin adsorption testing and as the master standard for further dilution and calibration in the concentration range of interest. This concentration was calculated to be the maximum agent concentration challenged by the NAEDS.

Duplicate samples were prepared by the addition of 2.0 mL of the master standard solution (1% VX in CFC) to each of two 10 mL glass reaction vials containing a small, cylindrically shaped, teflon-coated, magnetic stirbar and 200 mg of Amberlite XE-393 resin. The vials were sealed with a teflon-lined silicon septum and an aluminum crimp cap. The mixtures were stirred at 500 rpm. Stirring was interrupted after 10 minutes, two hours, and four hours to enable sampling of the liquid with a Hamilton 7001SN microliter syringe. For each sampling, a ⅜-inch, 25 gauge stainless steel needle was used to vent the sample to assure exactly 1.0 μL of liquid was withdrawn. All work was performed at room temperature (25±1 C.) in an air atmosphere.

Duplicate samples were also prepared to determine the effect of stirring on the adsorption efficiency of Amberlite XE-393 resin with VX-contaminated CFC. The procedure described above was followed. Thirty second stirring intervals were used initially and prior to each sampling to obtain homogeneity. During periods when the sample was not being stirred, the resin separated from the VX/CFC solution. The lower layer, containing VX and CFC, was sampled for chromatographic analysis.

Calibration

A series of six additional dilutions were prepared volumetrically from the 1% VX in a CFC master solution. A 1.0 μL aliquot of each was injected manually into the GC using the conditions and parameters described. VX was eluted at 9.6 minutes. Duplicate injections were made for the most dilute VX solutions in anticipation that these would include the concentration range of most interest. Reproducibility (±1%) was obtained for sample concentrations in this range.

Quantitative analysis of VX in CFC was accomplished using gas chromatography. A calibration curve was generated relating VX area counts to a known concentration of VX in CFC. VX area counts obtained for experimental samples of unknown VX concentration which had been exposed to the resin in the CFC solvent were quantitated based on this linear relationship.

The FID Minimum Detectable Level (MDL) for VX was determined to be 10 ng with a signal of better than twice the noise level for a 1.0 μL injection of VX in CFC. This corresponds to 0.001% (v/v) concentration of VX in CFC. Since 1% VX in CFC was chosen as the starting concentration for adsorption testing with Amberlite XE-393, the described procedure detected VX at the MDL after 99.9% had been adsorbed.

RESULTS AND DISCUSSION

Amberlite XE-393 Adsorption of VX

Adsorption Criteria

Two major criteria were considered in evaluating the NAEDS purification system for replacement by an adsorption column. First, the rate of sorption of threat chemical warfare agents from the contaminated CFC solvent must be significantly greater than the rate of sorption of the CFC solvent. Ideally, the CFC solvent would function solely to carry the agent to the sorption material. Second, the rate of agent desorption from the column material should be significantly less than the rate of sorption.

VX Adsorption Data

Table 3 presents a summary of the data obtained for this series of static adsorption experiments carried out using a concentration of 10 mL of VX per liter of CFC solvent. Samples "A" and "B" were stirred at 500 rpm whereas samples "C" and "D" were not stirred. The complete data for VX adsorption are in Table 4.

TABLE 3

VX Adsorption by Amberlite XE-393 Resin in CFC Solvent

| | Percent VX Adsorbed by Amberlite XE-393 Resin | | | |
|---|---|---|---|---|
| | Stirred at 500 rpm | | No Stirring* | |
| Time | Sample "A" | Sample "B" | Sample "C" | Sample "D" |
| 10 min | 97.0 | 95.7 | 45.2 | 50.0 |
| 2 hours | 99.1 | >99.9** | 99.0 | 98.8 |
| 4 hours | >99.9** | ND | 99.6 | 99.8 |

*Stirred initially and prior to each sampling for 30 seconds.
**FID cannot detect greater than 99.9% VX adsorption.
ND Not Determined.
Note: All samples prepared with 2.0 mL CFC, 200 mg XE-393 resin, and 20 μL VX.

TABLE 4

COMPLETE GAS CHROMATOGRAPHIC RESULTS: ADSORPTION OF VX BY AMBERLITE XE-393

| Peak Number | Compound | GC Area Counts Stirred Experiment | | | | | | | | GC Area Counts Unstirred Experiment | | | | | | | |
|---|---|---|---|---|---|---|---|---|---|---|---|---|---|---|---|---|---|
| | | Sample "A" | | | | Sample "B" | | | | Sample "C" | | | | Sample "D" | | | |
| | | 0 hr | 10 min | 2 hr | 4 hr | 0 hr | 10 min | 2 hr | | 0 hr | 10 min | 2 hr | 4 hr | 0 hr | 10 min | 2 hr | 4 hr |
| 1 | Me—P(=O)(F)—OEt | 2.5 | 0.0 | 0.0 | 0.0 | 2.5 | 0.0 | 0.0 | | 2.5 | 2.2 | 0.2 | 0.2 | 2.5 | 2.0 | 0.3 | 0.2 |
| 2 | Me—P(=O)(H)—OEt | 1.2 | 0.0 | 0.0 | 0.0 | 1.2 | 0.0 | 0.0 | | 1.2 | 0.6 | 0.6 | 0.6 | 1.2 | 0.6 | 0.5 | 0.5 |
| 3 | Me—P(=O)(OEt)—OEt | 0.3 | 0.4 | 1.0 | 1.1 | 0.3 | 0.1 | 0.4 | | 0.3 | 0.4 | 1.2 | 2.0 | 0.3 | 0.5 | 1.3 | 1.9 |
| 4 | Me—P(=S)(OEt)—OEt | 4.3 | 1.4 | 1.4 | 1.3 | 4.3 | 1.0 | 0.6 | | 4.3 | 3.9 | 4.4 | 5.1 | 4.3 | 4.1 | 4.2 | 4.4 |
| 5 | $ClCH_2CH_2N(i$-$C_3H_7)_2$ | 2.0 | 0.0 | 0.0 | 0.0 | 2.0 | 0.0 | 0.0 | | 2.0 | 1.2 | 0.0 | 0.0 | 2.0 | 1.0 | 0.0 | 0.0 |
| 6 | $ClCH_2CH_2$—O—$CH_2CH_2N(i$-$C_3H_7)_2$ | 4.1 | 3.4 | 1.5 | 0.8 | 4.1 | 0.4 | 0.0 | | 4.1 | 6.5 | 0.7 | 0.0 | 4.1 | 5.4 | 1.1 | 0.0 |
| 7 | $EtSCH=CHN(i$-$C_3H_7)_2$ | 0.6 | 0.7 | 1.4 | 1.2 | 0.6 | 0.0 | 0.0 | | 0.6 | 0.2 | 0.0 | 0.1 | 0.6 | 0.2 | 0.1 | 0.0 |
| 8 | Me—P(=O)(Cl)—$SCH_2CH_2N(i$-$C_3H_7)_2$ | 0.0 | 0.2 | 1.4 | 1.2 | 0.0 | 0.0 | 0.0 | | 0.0 | 0.0 | 0.0 | 0.0 | 0.0 | 0.0 | 0.0 | 0.0 |
| 9 | Me—P(=O)(OEt)—O—P(=O)(OEt)—Me | 1.0 | 0.9 | 0.8 | 0.6 | 1.0 | 0.0 | 0.0 | | 1.0 | 0.0 | 0.0 | 0.0 | 1.0 | 0.0 | 0.0 | 0.0 |
| 10 | Me—P(=S)(OEt)—O—P(=O)(OEt)—Me | 1.6 | 0.0 | 0.0 | 0.0 | 1.6 | 0.0 | 0.0 | | 1.6 | 0.0 | 0.0 | 0.0 | 1.6 | 0.0 | 0.0 | 0.0 |
| 11 | Me—P(=O)(OEt)—$OCH_2CH_2N(i$-$C_3H_7)_2$ | 8.5 | 0.0 | 0.0 | 0.0 | 8.5 | 0.0 | 0.0 | | 8.5 | 3.2 | 0.0 | 0.0 | 8.5 | 4.1 | 0.0 | 0.0 |
| 12 | Me—P(=S)(OEt)—$OCH_2CH_2N(i$-$C_3H_7)_2$ | 0.4 | 0.4 | 0.4 | 0.2 | 0.4 | 0.0 | 0.0 | | 0.4 | 0.0 | 0.0 | 0.0 | 0.4 | 0.0 | 0.0 | 0.0 |
| 13 | Me—P(=O)(OEt)—$SCH_2CH_2N(i$-$C_3H_7)_2$ | 785 | 16.1 | 2.2 | 0.3 | 785 | 24.1 | 0.1 | | 785 | 361 | 4.1 | 1.0 | 785 | 336 | 5.2 | 0.7 |
| 14 | $[(i$-$C_3H_7)_2NCH_2CH_2]_2S$ | 5.7 | 0.0 | 0.0 | 0.4 | 5.7 | 0.0 | 0.2 | | 5.7 | 0.0 | 0.0 | 0.0 | 5.7 | 0.0 | 0.0 | 0.0 |

Rate of VX Adsorption

The rate of VX adsorption by Amberlite XE-393 resin is significantly greater than the rate of CFC adsorption. The rate of VX desorption from the resin material is significantly less than the rate of VX adsorption. The two major criteria established for successful replacement of the NAEDS purification system have been met under the conditions tested.

The rate of VX adsorption is most significant during the initial stages of the stirred experiment. During the first 10 minutes, about 96% of the VX initially present in the CFC mixture had been retained by the resin. The rate of VX adsorption for the final 4% was significantly reduced.

Effect of Stirring on VX Adsorption Rate

Identically prepared unstirred mixtures resulted in VX adsorption rates significantly different than rates obtained for stirred samples. Only 50% of the VX initially present in the unstirred CFC mixture had been retained by the resin after 10 minutes. However, after two and four hours, adsorption results were comparable to the stirred experiments.

Although only two rates of stirring were investigated, some very important data were obtained. Since nearly all of the VX initially present was absorbed by the resin after four hours, regardless of stirring rate, the capacity of the resin to adsorb and to retain VX was not significantly affected by stirring.

Chlorofluorocarbon Solvent Assessment

The quality of purified freon required for optimum NAEDS operation should be defined. Preliminary data from this experiment indicates that VX is preferentially adsorbed by Amberlite XE-393 resin when compared to some VX impurities. The purified CFC that results did not contain VX, however; very low concentrations of VX impurities were detected.

No evidence of resin induced CFC decomposition or contamination was detected in a control sample. The major CFC impurity detected by gas chromatography was preferentially adsorbed by Amberlite XE-393 resulting in a recovered product of greater purity.

NAEDS Relevance

The 1% agent concentration in CFC was chosen since it appears to be the maximum theoretical threat that the NAEDS might encounter. Amberlite XE-393 efficiently removes VX from contaminated CFC in a timely manner under the "static" conditions of this experiment.

Transformation of the demonstrated potential of this resin for CFC purification into a practical operating system should eventually include a series of column experiments in which breakthrough times, sensitivity of capacity to flow rate, effect of various column packing techniques, the behavior of resins in CFC, fate of agents on the resin, resin regeneration, and the effect of impurities on resin adsorption are investigated. The quality of purified freon required for reuse needs to be defined.

CONCLUSIONS

The following conclusions can be drawn from this work.

a. Amberlite XE-393, a macroreticular, strong acid resin, removed VX from VX-contaminated 1,1,2-trichloro-1,2,2-trifluoroethane. Samples mixed for ten minutes, two hours, and four hours showed resin adsorption efficiencies for VX of 97%, 99%, and greater than 99.9%, respectively.

b. The capacity of Amberlite XE-393 resin to adsorb VX is not significantly affected by stirring in the presence of 1,1,2-trichloro-1,2,2-trifluoroethane.

c. The rate of VX adsorption by Amberlite XE-393 resin is significantly accelerated by stirring in the presence of 1,1,2-trichloro-1,2,2-trifluoroethane.

d. No evidence of resin induced 1,1,2-trichloro-1,2,2-trifluoroethane decomposition or contamination was detected in a control sample. The major 1,1,2-trichloro-1,2,2-trifluoroethane impurity detected by gas chromatography was preferentially adsorbed by Amberlite XE-393 resulting in a recovered product of greater purity.

In conclusion, while a specific embodiment of the invention has been shown and described in detail to illustrate the application of the principles of the invention, it will be understood that the invention may be embodied otherwise without departing from such principles.

What is claimed is:

1. In the process of decontaminating o-ethyl S-(2-diisopropylaminoethyl) methylphosphonothiolate from a chlorofluorocarbon solution, the improvement consisting essentially of contacting said solution containing o-ethyl S-(2-diisopropylaminoethyl) methylphosphonothiolate with a macroreticular strong acid resin.

2. In the process of decontaminating o-ethyl S-(2-diisopropylaminoethyl) methylphosphonothiolate from a 1-1,2-trichloro-1,2,2-trifluoroethane solution, the improvement consisting essentially of contacting said solution containing o-ethyl S-(2-diisopropylaminoethyl) methylphosphonothiolate with a macroreticular strong acid resin.

3. In the process of decontaminating o-ethyl S-(2-diisopropylaminoethyl) methylphosphonothiolate from a chlorofluorocarbon solution, the improvement consisting essentially of contacting said solution containing o-ethyl S-(2-diisopropylaminoethyl) methylphosphonothiolate with a polydivinylbenzene strong acid resin.

* * * * *